I. MACY & J. C. WATKINS.
Wheel Cultivator.
No. 197,038. Patented Nov. 13, 1877.
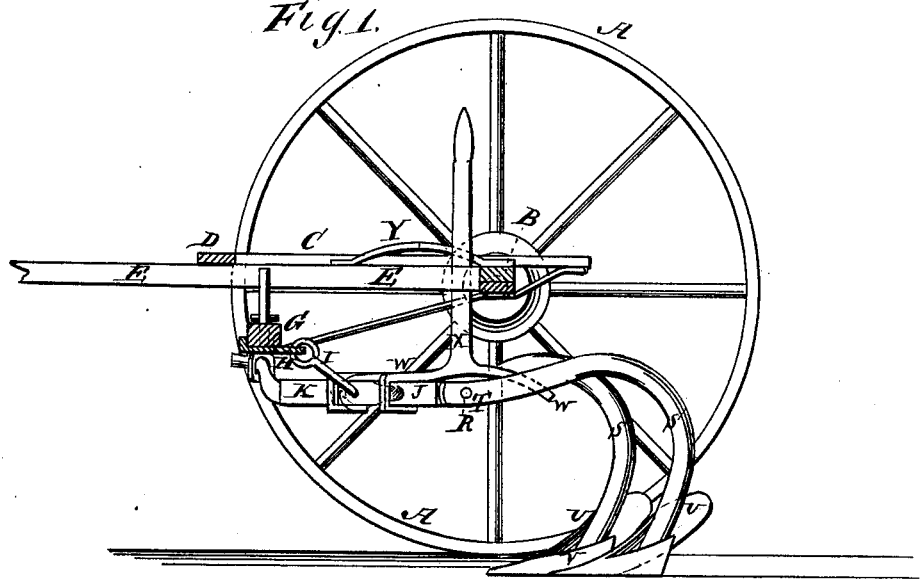
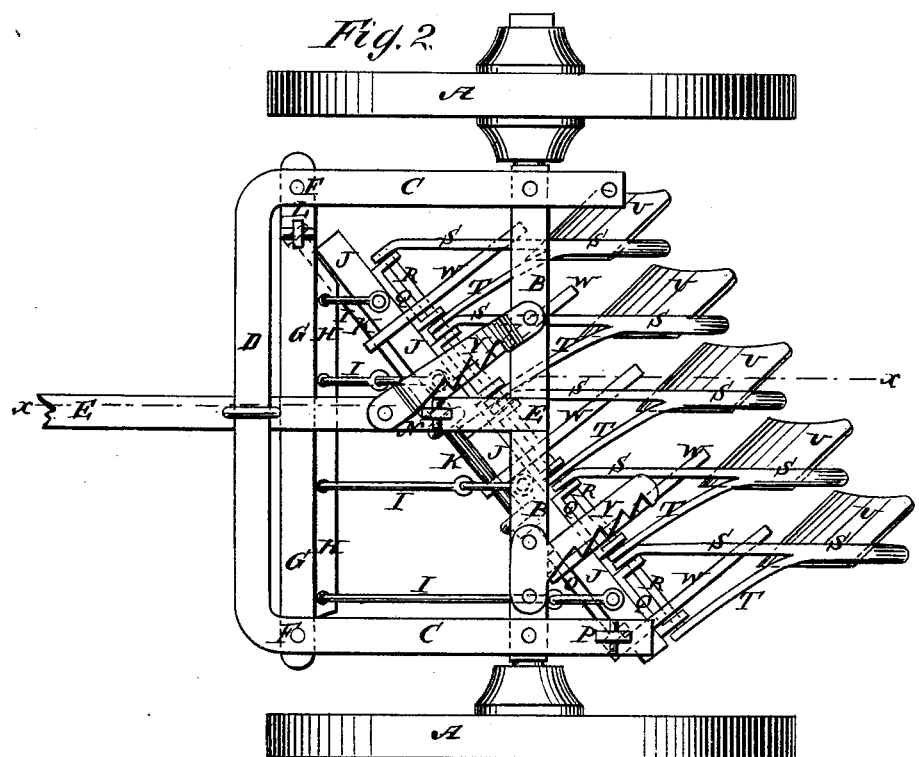
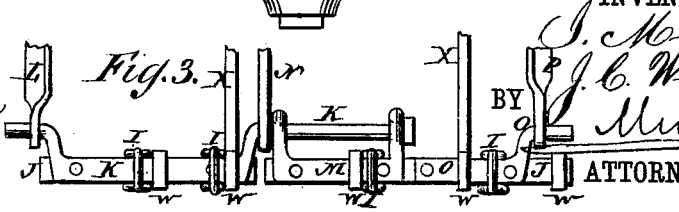
WITNESSES:
E. Wolff
Edgar Tate
INVENTORS:
I. Macy
J. C. Watkins
BY
Munn & Co
ATTORNEYS.

UNITED STATES PATENT OFFICE.

IRWIN MACY AND JOHN C. WATKINS, OF HARRISBURG, OREGON.

IMPROVEMENT IN WHEEL-CULTIVATORS.

Specification forming part of Letters Patent No. 197,038, dated November 13, 1877; application filed July 13, 1877.

*To all whom it may concern:*

Be it known that we, IRWIN MACY and JOHN CYRUS WATKINS, of Harrisburg, county of Linn, and State of Oregon, have invented a new and useful Improvement in Wheel-Cultivators, of which the following is a specification:

Figure 1 is a vertical longitudinal section of our improved cultivator, taken through the line *x x*, Fig. 2. Fig. 2 is a top view of the same. Fig. 3 is a detail front view of the diagonal cross-bar.

Similar letters of reference indicate corresponding parts.

The object of this invention is to furnish an improved cultivator, simple in construction, convenient in use, and effective in operation, being easily controlled, and readily adjusted to work at any desired depth in the ground.

The invention consists in the combination of the inclined or diagonal bar, made in two parts or sections the draw-rods and the braces, with the plow-beams and the frame-work of the machine; in the combination of the adjustable perforated supporting-bars with the inclined or diagonal bar to which the plow-beams are attached, and with the frame-work of the machine; in the combination of the levers and their catch-bars with the rigid arms, the diagonal bar, and the plow-beams, as hereinafter fully described.

In the drawing, A are the wheels, which revolve upon the journals of the axle B. To the axle B, near its ends, are attached the rear parts of the bars C, the forward ends of which are connected by a cross-bar, D. The bars C D C may be made in one piece, if desired. E is the tongue, which is attached to the centers of the axle B and the cross-bar D. To the forward parts of the bars C are attached the upper ends of two bars or posts, F, (shown in Fig. 2,) to the lower ends of which are attached the ends of the cross-bar G. To the center of the cross-bar G is attached the draft, the tongue E being used only for guiding the machine. To the lower side of the bar G is attached a plate, H, the forward edge of which is turned up upon the forward side of the said bar G. The rear edge of the plate H projects in the rear of the bar G, and has a number of holes formed in it to receive the forward ends of the draw-rods I, the rear ends of which are connected with the inclined or diagonal bar J, by clevises or other suitable means. The diagonal bar J is made in two parts, placed in line with each other. To the forward edge of the forward part of the bar J is attached a bar, K, the forward end of which is bent into crank form, and passes through a hole in the lower end of the bar L. The bar L passes up through a hole in the end of the bar G, and has a number of holes formed through it to receive a pin, which passes through one or the other of the said holes, and rests upon the upper side of the said bar G. The rear end of the bar K is bent into crank form, and passes through eyes formed upon the upper edge of the bar M, attached to the forward edge of the forward end of the rear part of the diagonal bar J. The crank-arm formed upon the rear end of the bar K also passes through a hole formed in the lower end of the bar *n*, which passes up through a hole in the tongue E, and has a number of holes formed in it to receive a pin, which rests upon the upper side of the said tongue E. To the forward edge of the rear part of the bar J is attached a bar, O, the rear end of which is bent into crank-form, and passes through a hole in the lower end of the bar P, which passes up through a hole in the rear end of the bar C, and has a number of holes formed in it to receive a pin, which rests upon the upper side of the said bar C.

By this construction, by adjusting the three bars L N P, the diagonal bar J may be adjusted higher or lower to cause the plows to run shallower or deeper in the ground. To the rear edge of the parts of the diagonal bar J are attached bars Q, the ends of which are bent outward, and have holes formed through them to receive the rods R. The rods R also pass through holes in the ends of the plow-beams S and in the ends of the braces T, formed upon or attached to the said beams S, and which project in such directions as to be at right angles with the diagonal or inclined bar J. The bars Q are made of such a length that their turned-out ends may prevent the ends of the beams S and braces T from lateral movement upon the rods R. The rear ends of the beams S are curved downward, and to them are attached the shovel-plows U, which are made with land-sides V, to prevent the side draft, and cause the plows to run easier.

W are arms attached to the inclined bar J, and which project at right angles with said bar, so as to pass beneath the beams S, and thus prevent the plows from dropping too low. To the middle part of one of the arms W of each section is attached, or upon it is formed, the lower end of a lever, X. The upper parts of the levers X move along notched bars Y, attached to the frame-work of the machine, and which hold the said levers in any position into which they may be adjusted.

The arms W and levers X enable the plows to be partially raised from the ground, or fully raised from the ground, for convenience in turning around and passing from place to place.

The levers X may also be used for adjusting the plows to run deeper or shallower in the ground. As the upper ends of the levers X are moved back the forward ends of the beams are lowered, and as they are moved forward the ends of the beams are raised, causing the plows to run deeper or shallower in the ground, as may be desired.

Having thus fully described our invention, we claim as new and desire to secure by Letters Patent—

1. The combination of the inclined or diagonal bar J, made in two parts or sections, the draw-rods I, and the braces T, with the plow-beams S and the frame-work of the machine, substantially as herein shown and described.

2. The combination of the adjustable perforated bars L N P with the inclined or diagonal bar J, to which the plow-beams are attached, and with the frame-work of the machine, substantially as herein shown and described.

3. The combination of the levers X and catch-bars Y with the arms W, the diagonal bar J, and the plow-beams S, substantially as herein shown and described.

IRWIN MACY.
JOHN CYRUS WATKINS.

Witnesses:
P. H. COUCH,
J. P. SCHOVLING.